UNITED STATES PATENT OFFICE.

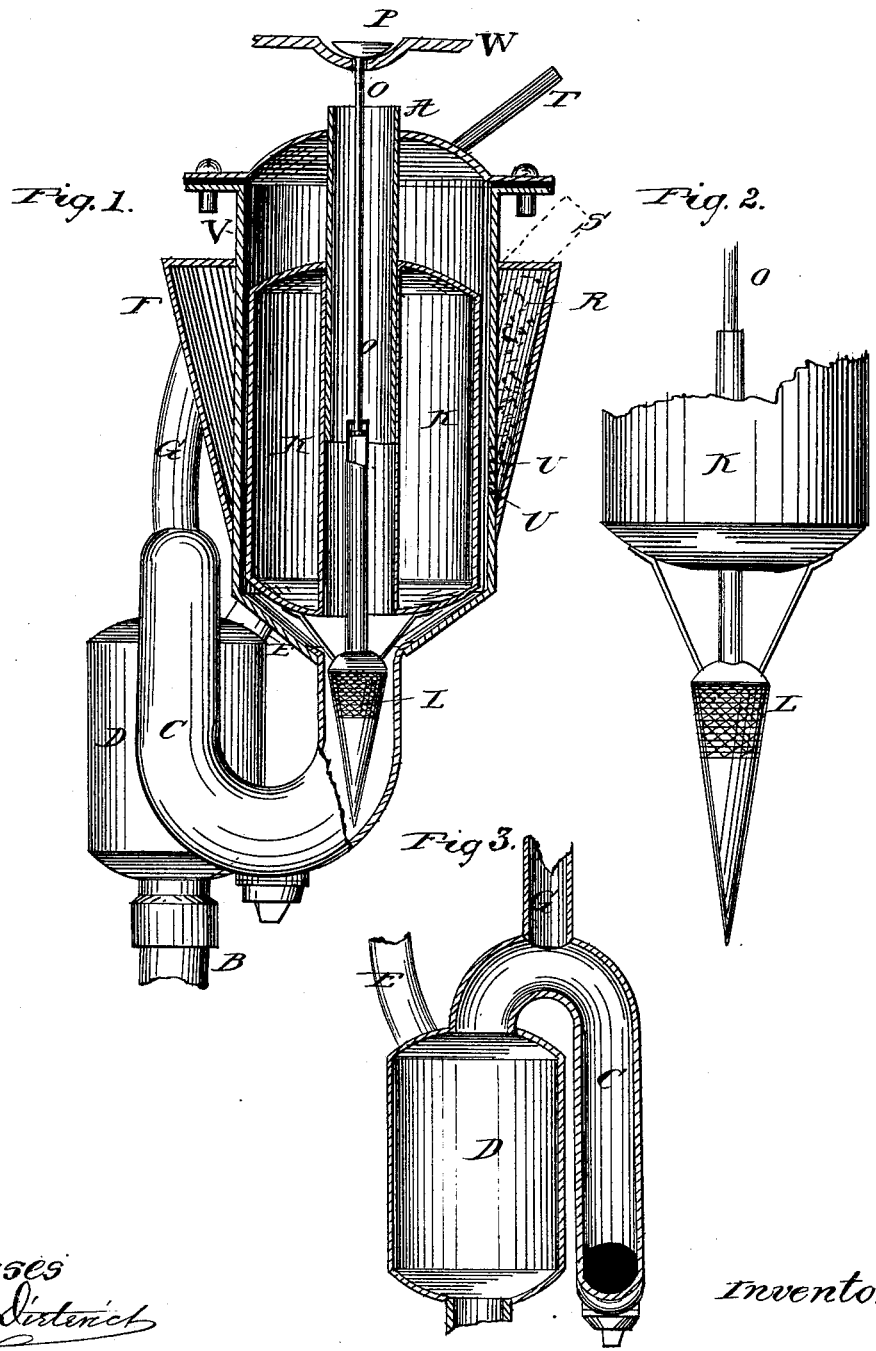

JOHN H. MACKIE, OF OAKLAND, CALIFORNIA.

IMPROVEMENT IN SEWER-TRAPS.

Specification forming part of Letters Patent No. 197,036, dated November 13, 1877; application filed February 24, 1877.

*To all whom it may concern:*

Be it known that I, JOHN H. MACKIE, of Oakland, in the county of Alameda and State of California, have invented certain new and useful Improvements in Sink and Sewer Traps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

It is well known that the ordinary traps of sinks, wash-basins, and baths of houses are liable frequently to siphon out, and thus allow offensive gases to rise through the traps and escape into the houses; and the S or hand traps, which are placed lower down and immediately under the basements, are likely to act as barriers to the outflow of gases into the sewer, and, what is worse, they soon become partly filled with putrefying matter, and thus form small cess-pools, which generate offensive gases to rise through the upper siphons into the house.

My improvement consists of a novel construction and arrangement of buoy and cork, in combination with the siphon-tube of a sewer-trap, which will be fully understood by the following description.

Figure 1 is a vertical section of my improved sewer-trap, showing the buoy with cork attached thereto. Fig. 2 is a detached view of part of the buoy and the cork more elongated. Fig. 3 is a detached view, better showing the relation of chamber D and tube C, which co-operate with the cork and buoy, as will be explained.

In the drawings, V represents a chamber which surrounds the inlet-tube A, coming from the sink, sewer, catch-basin, or any other discharge of waste-water. In this chamber V, and around the pipe A, is a float, K, to the lower end of which is rigidly attached a cork, L, fitting the siphon-tube C when the buoy sinks, as shown in Fig. 1.

As the water passes down the tube A into the chamber V, the buoy is floated upward, raising the cork L from its seat, and thus allowing a free passage of water through the trap. When the water is turned off or ceases to flow into chamber V, the buoy settles down and the cork L closes the tube C, leaving about two inches of water above the cork and sixteen inches below in tube C, thus giving eighteen inches of water to prevent the upflow of gases through the siphon-tube C.

For further description of other parts herein shown by the drawing, reference is made to the patent already allowed to me, April 20, 1877, and numbered 188,652. In this application I confine my claim to the buoy and cork, in combination with the siphon-tube, as above described.

Having thus described my improvement, I claim—

In combination with a siphon-trap, a buoy, K, and cork L above the siphon, substantially in the manner and for the purposes set forth.

In testimony that I claim the foregoing as my own I affix my signature in presence of two witnesses.

JOHN H. MACKIE.

Witnesses:
 DANIEL BREED,
 THOMAS C. CONNOLLY.